United States Patent
Van Wiemeersch et al.

(10) Patent No.: US 6,853,853 B1
(45) Date of Patent: Feb. 8, 2005

(54) REMOTE CONTROL SYSTEM FOR OPERATING SELECTED FUNCTIONS OF A VEHICLE

(75) Inventors: John Robert Van Wiemeersch, Novi, MI (US); David Anthony Symanow, Plymouth, MI (US); Lisa Therese Boran, Livonia, MI (US); Mark Edward Porter, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 681 days.

(21) Appl. No.: 09/713,115

(22) Filed: Nov. 15, 2000

(51) Int. Cl.$^7$ .............................. G01S 13/75; H04B 7/00
(52) U.S. Cl. ................. 455/569.2; 455/11.1; 455/41.2; 342/42; 340/825.31
(58) Field of Search .............................. 455/3.02, 3.03, 455/3.06, 404.1, 410, 552, 422.1, 423, 426.1, 427, 456.6, 458, 9, 11.1, 12.1, 13.1, 41.1, 41.2, 569.2, 575.9, 92, 95; 342/357.09, 42; 701/207; 370/338, 238; 379/196, 211, 58; 340/571, 825.31, 436, 435

(56) References Cited

U.S. PATENT DOCUMENTS

| | | | |
|---|---|---|---|
| 4,809,316 A | * | 2/1989 | Namekawa ............. 455/404.1 |
| 4,893,240 A | | 1/1990 | Karkouti |
| 5,432,495 A | | 7/1995 | Tompkins |
| 5,563,453 A | | 10/1996 | Nyfelt |
| 5,565,858 A | * | 10/1996 | Guthrie ................... 340/10.33 |
| 5,576,692 A | * | 11/1996 | Tompkins et al. ..... 340/825.49 |
| 5,606,307 A | | 2/1997 | Kuan |
| 5,929,769 A | * | 7/1999 | Garnault .................... 340/5.61 |
| 5,966,081 A | | 10/1999 | Chesnutt |
| 6,031,465 A | | 2/2000 | Burgess |
| 6,580,916 B1 | * | 6/2003 | Weisshaar et al. ....... 455/456.1 |

* cited by examiner

*Primary Examiner*—David Hudspeth
*Assistant Examiner*—Kamran Afshar

(57) ABSTRACT

A system (10) for long-range, remote keyless control of predefined functions for a vehicle (1) is provided that has a long-range wireless receiver (22) that receives transmission signals (25) from a wireless transmission source (24), such as a cellular phone network or satellite network. A wireless signal transmitter (22) is mounted on the vehicle (1) and uses the same protocol (15) as a hand-held wireless transmitter (12) to perform various vehicle functions, such as locking/unlocking doors (16), opening/closing windows and/or the trunk (18). The advantage being the low cost addition of the long-range control using the vehicle's existing short-range RF receiver and electrical infrastructure.

7 Claims, 2 Drawing Sheets

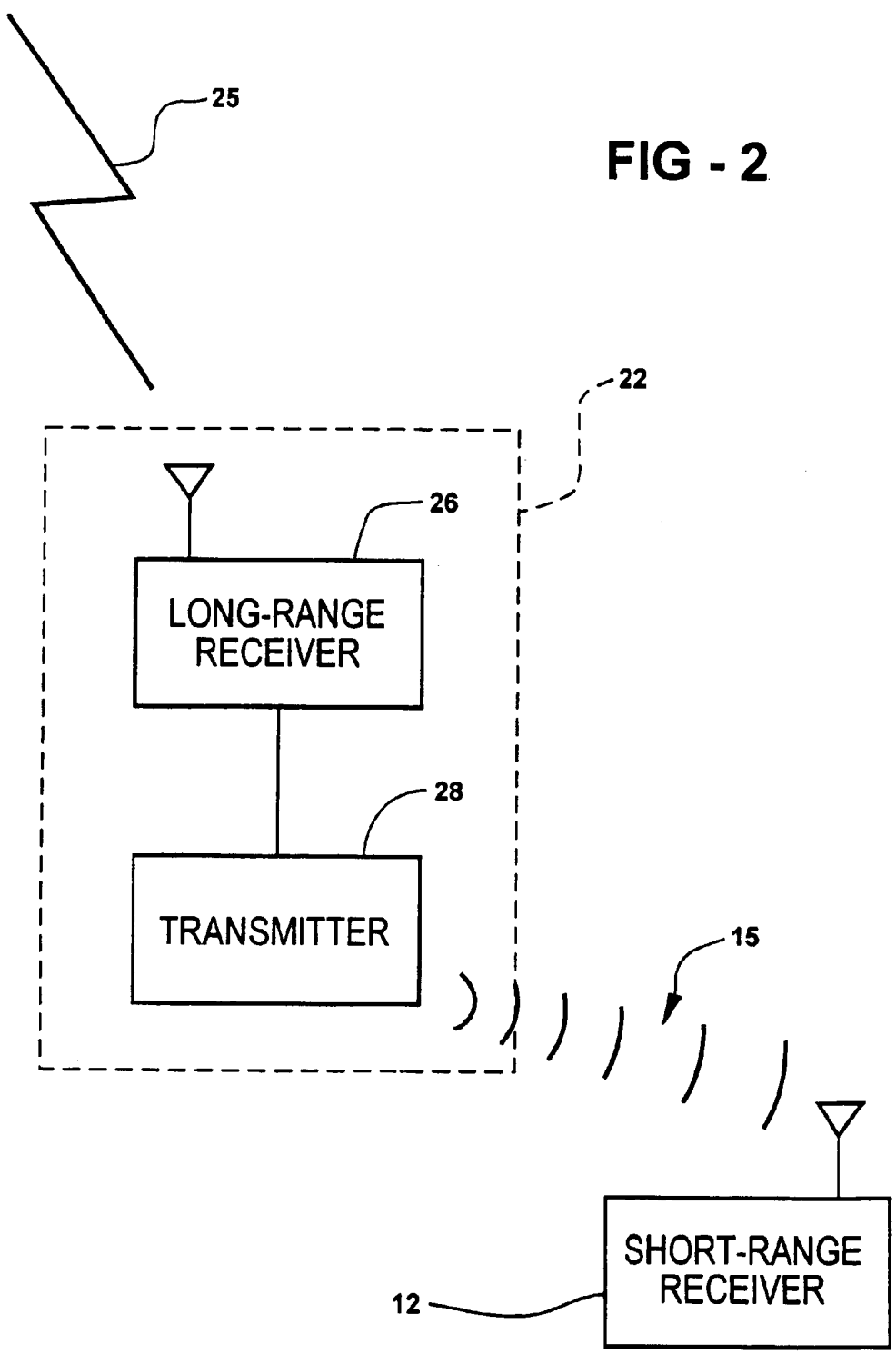

REMOTE CONTROL SYSTEM FOR OPERATING SELECTED FUNCTIONS OF A VEHICLE

TECHNICAL FIELD

The present invention relates generally to a remote control system for operating selected functions of a vehicle, and more particularly to a remote control system having a transmitter mounted on the vehicle having long range capability.

BACKGROUND OF THE INVENTION

Various remote control systems for motor vehicles are known and are widely used, especially in the area of security. Remote control keyless entry systems are typically a pocket-sized fob with one or more pushbuttons that send encoded RF signals to a vehicle-installed receiver and perform various functions such as locking and unlocking doors, locking and unlocking the trunk, activating and de-activating an alarm, turning lights on and off, and even starting the vehicle.

The key fob can be used within a fixed vicinity of the vehicle. The fob has a typical range of 10–20 meters from the vehicle. Special antennas and receivers can extend this to a practical limit of about 250–350 meters. Therefore, when a user is further away than typically 10–20 meters, the fob is ineffective.

Current systems that are capable of long range communications require software, hardware and special wiring changes to be made to the vehicle in order for the addition of the long-range system to be recognized by the vehicle. Because the addition of the long-range system is not transparent to the vehicle's existing short-range system, it adds unwanted cost and complexity to the remote control system. For high end luxury vehicle features, it is more cost effective to have one common high volume design that can be easily connected to numerous low volume unique vehicle architectures.

Thus there is a need for a long-range remote control system that does not add unwanted cost and complexity to a remote control system. In addition, the system should be capable of being retro-fit to later model vehicles that were originally produced without remote control, or keyless entry, systems without the need for extensive modifications to the vehicle and its wiring system.

SUMMARY OF THE INVENTION

It is an object of the present invention to provide control of remote keyless entry functions from a substantial distance, on the order of several hundred to several thousand kilometers. It is another object of the present invention to provide a long-range, keyless entry system that can be retrofit to older model vehicles.

It is a further object of the present invention to reduce the cost and complexity of remote keyless entry systems.

In carrying out the above objects and other objects and features of the present invention, a long-range, remote keyless entry system for a vehicle is provided that has a long-range wireless receiver that receives transmission signals from a wireless transmission source, such as a cellular phone network or satellite network. A wireless signal transmitter is mounted on the vehicle and uses the same protocol as the hand-held wireless transmitter (key fob) to perform various vehicle functions, such as locking/unlocking doors, opening/closing windows and/or the trunk, etc. A gateway device is mounted on the vehicle and controls the short-range transmitter based on instructions the gateway device receives from the long-range receiver.

Therefore, in accordance with the present invention, a user can send a transmission signal, via a cellular phone, to the long-range wireless receiver. The instructions received from the long-range receiver are then communicated to the short-range transmitter by way of the gateway device. In this regard, a long-range system can be easily added to an existing remote keyless entry system (already installed on the vehicle) at a reduced cost. This allows the user to perform various vehicle functions from a substantial distance with a mere phone call or Internet connection to their vehicle.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 2 is a block diagram of the gateway device of the system of the present invention.

DETAILED DESCRIPTION OF PREFERRED EMBODIMENTS

Figure 1:
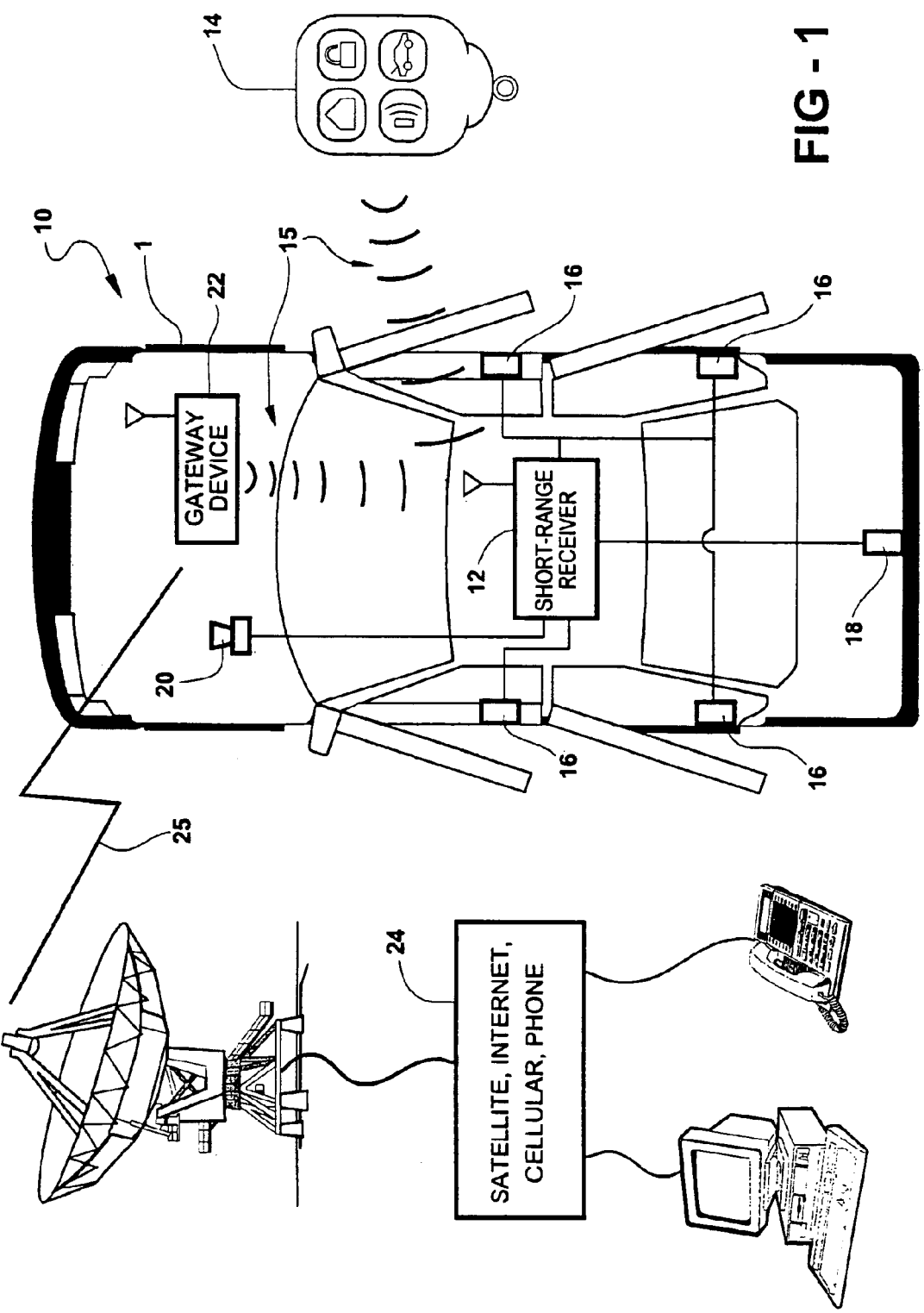
FIG. 1 is a block diagram of the remote keyless entry system according to the present invention.

FIG. 1 is a block diagram of a vehicle 1 having the remote keyless entry system 10 of the present invention. The vehicle 1 is equipped with a short-range wireless receiver 12 that is capable of receiving normal short-range signals from a wireless handheld transmitter 14 that is typically carried by the user, such as a key fob. The range of the handheld transmitter 14 is typically 10–20 meters and controls several functions that include, but are not limited to, lock, unlock, trunk control, panic alarm activation and deactivation, and remote start. Other functions too numerous to mention herein are also capable of being controlled by the remote system and one skilled in the art is aware of the nearly limitless possibilities.

The short-range receiver 12 is typically hard wired to each function that it is designed to control. For example, in FIG. 1, the short-range receiver 12 is hard wired to the door locks 16, the trunk lock, 18 and the vehicles horn 20.

The handheld transmitter 14 is typically and RF transmitter that is capable of broadcasting at 315 MHz with a predefined protocol 15. The broadcast signals are typically coded or encrypted in order to identify the broadcast signal with the particular vehicle and particular vehicle function being controlled. The broadcast signals are transmitted to the short-range receiver 12, where the commands are executed. Up to this point, this is typical of a remote keyless entry system already known in the art.

The present invention provides a novel approach to long-range remote keyless entry in a simple, yet effective, system that can be easily implemented on new and old vehicles without significant modifications to the vehicle's existing wiring system. A gateway device 22 is used to send instructions to the short-range receiver based on commands received from a long-range transmitter 24. The gateway device 22 provides communication between the short-range and long-range communication protocols and allows control commands to be relayed to the vehicle from distant locations.

The gateway device 22 of the present invention is further described in conjunction with FIG. 2. The device 22 is installed on the vehicle and has a long-range receiver 26. The long-range receiver 24 is capable of receiving a coded or encrypted message from a wireless transmission source (not shown in FIG. 2, but shown in FIG. 1 by reference number 24), such as an Internet connection, a cellular telephone network or a satellite network. The long-range signal has a predefined protocol 25 that is different from the predefined protocol 15 used in conjunction with the short-range receiver (not shown in FIG. 2).

The long-range receiver 26 communicates the signal to a second wireless transmitter 26 that is also mounted on the vehicle (not shown in FIG. 2). The second wireless transmitter 28 uses the same predefined protocol 15 as the handheld transmitter (not shown in FIG. 2) to communicate the commands to the short-range receiver 12. This feature eliminates the need for hardwired connections between the long-range transmitter and the devices 16, 18, 20 on the vehicle being controlled by the long-range receiver 26. There are no additional wiring connections to maintain, thereby reducing the cost and complexity of installation, maintenance and trouble-shooting the system of the present invention.

This offers a significant cost advantage on large-scale applications where production volumes are low on any one vehicle and each vehicle has unique electrical interface and packaging requirements. By using the vehicle's existing short-range RF receiver as the communication entry port, this invention allows one simple device produced at high volumes to be applied to numerous electrically unique vehicles produced at low volumes, i.e. luxury vehicles.

The system of the present invention increases range of remote control from the prior art range of tens of meters to a range that is virtually limitless on the order of hundreds and thousands of kilometers. In addition, the present invention does not require complex wiring connections, nor does it require an intermediate communication provider, or clearing house, to decipher and implement the commands.

The invention covers all alternatives, modifications, and equivalents, as may be included within the spirit and scope of the appended claims.

What is claimed is:

1. A method for long-range remote control of predetermined vehicle functions on a vehicle having an existing short-range receiver for controlling a plurality of vehicle functions and being wired thereto, and a gateway device in communication with said short-range receiver and a remote long-range wireless transmission source, the existing short-range receiver having communication capabilities with an existing short-range remote control transmission device corresponding thereto, said method comprising the steps of:

said gateway device receiving a long-range coded command from a remote long-range wireless transmission source, said gateway device being mounted on said vehicle, said long-range coded command having a first predefined protocol;

said gateway device translating said long-range coded command into a second predefined protocol defining a short-range coded command;

said gateway device transmitting said short-range coded command to the short-range receiver mounted on the vehicle, said transmission by way of a radio frequency sigal that is the same as a communication signal between the existing short-range receiver and its corresponding short-range remote control transmission device;

said short-range receiver controlling the operation of at least one of a plurality of vehicle functions it is wired to by using the received coded short-range command having a second predefined protocol that corresponds to the long-range coded command received and translated by said gateway device.

2. The method as claimed in claim 1 wherein said step of said gateway device receiving a long-range coded command further comprises receiving a long-range coded command from a cellular system.

3. The method as claimed in claim 1 wherein said step of said gateway device receiving a long-range coded command further comprises receiving a long-range coded command from a satellite system.

4. The method as claimed in claim 1 wherein said step of said gateway device receiving a long-range coded command further comprises receiving a long-range coded command from a digital broadcast system.

5. The method as claimed in claim 1 wherein said step of said gateway device receiving a long-range coded command further comprises receiving a long-range coded command from an Internet connection.

6. The method as claimed in claim 1 wherein said step of said gateway device receiving a long-range coded command further comprises receiving a long-range coded command from a phone connection.

7. The method as claimed in claim 1 wherein said step of said gateway device receiving a long-range coded command further comprises receiving a long-range coded command from a pager system.

* * * * *